(12) United States Patent
Paavola et al.

(10) Patent No.: US 11,870,088 B2
(45) Date of Patent: Jan. 9, 2024

(54) STRUCTURAL BATTERY WITH PRESSURE HOUSING FOR PORTABLE ELECTRONIC DEVICES

(71) Applicant: Intel Corporation, Santa Clara, CA (US)

(72) Inventors: Juha Paavola, Hillsboro, OR (US); Naoki Matsumura, San Jose, CA (US); Mikko Makinen, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 615 days.

(21) Appl. No.: 16/844,668

(22) Filed: Apr. 9, 2020

(65) Prior Publication Data

US 2020/0303699 A1 Sep. 24, 2020

(51) Int. Cl.
*H01M 50/24* (2021.01)
*H01M 10/0525* (2010.01)
*H01M 50/169* (2021.01)
*H01M 50/284* (2021.01)
*H01M 50/209* (2021.01)

(52) U.S. Cl.
CPC ....... *H01M 50/24* (2021.01); *H01M 10/0525* (2013.01); *H01M 50/169* (2021.01); *H01M 50/209* (2021.01); *H01M 50/284* (2021.01)

(58) Field of Classification Search
CPC .. H01M 50/24; H01M 50/169; H01M 50/209; H01M 50/284; H01M 50/233; H01M 10/0525; G06F 1/188; Y02E 60/10
See application file for complete search history.

(56) References Cited

U.S. PATENT DOCUMENTS

| | | | |
|---|---|---|---|
| 2006/0176014 A1* | 8/2006 | Moon | H01M 50/209 320/112 |
| 2009/0011331 A1* | 1/2009 | Stringer | C04B 35/6455 429/185 |
| 2017/0257707 A1* | 9/2017 | Shimoda | H04R 7/04 |

(Continued)

FOREIGN PATENT DOCUMENTS

KR 2018/0092406 * 8/2018 ............ H01M 10/04

OTHER PUBLICATIONS

English Translation of KR 2018/0092406.*

*Primary Examiner* — Kiran Quraishi Akhtar
(74) *Attorney, Agent, or Firm* — HANLEY, FLIGHT & ZIMMERMAN, LLC (57) ABSTRACT

The present disclosure is directed to systems and methods for improving the rigidity or stiffness of an electronic device chassis or housing using a structural secondary battery. The structural secondary battery includes a compression skin disposed about one or more secondary storage cells. The compression skin exerts a compressive force of at least 0.5 atmospheres on the one or more secondary storage cells. A structural member is bonded to the compression skin. The structural member includes a relatively thin (e.g. 0.1 mm or less), rigid (e.g., Young's Modulus of at least 300 GPa), member, such as a sapphire crystal. The structural member may then be bonded or otherwise detachably or non-detachably affixed to an aperture formed in the electronic device chassis or housing. The bonding of the structural member to the electronic device chassis or housing beneficially improves the stiffness of the chassis or housing.

20 Claims, 7 Drawing Sheets

(56) References Cited

U.S. PATENT DOCUMENTS

2018/0123191 A1* 5/2018 Dudley ............... H01M 50/543
2019/0131597 A1* 5/2019 Oksengendler ..... H01M 50/296
2019/0393461 A1* 12/2019 Pare ..................... H01M 50/56

* cited by examiner

STRUCTURAL BATTERY WITH PRESSURE HOUSING FOR PORTABLE ELECTRONIC DEVICES

TECHNICAL FIELD

The present disclosure relates to energy storage devices for portable electronic devices, more specifically to secondary batteries incorporating structural elements for use in portable electronic devices.

BACKGROUND

Secondary, or rechargeable, batteries such as Lithium ion (Li-ion) batteries are widely used to provide power in portable electronic devices. While incremental improvements in energy density of Li-ion batteries typically occur on an ongoing basis, frequently such incremental improvements often do not keep pace with consumer expectations or consumer demand.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

A Lithium metal (Li-metal) anode has been suggested as improving the energy density in secondary or rechargeable storage devices, such as Lithium-air (Li-air), Lithium-Sulfide (Li—S), and Lithium metal batteries. The use of a Li-metal anode may improve the energy density of secondary batteries by 20% or more. However, a Li-metal anode may swell during charge and shrink during discharge. Secondary batteries must typically be maintained under an external pressure, for example about 0.5 atmospheres (~7.3 psig) to compress the Li-metal particles forming the anode with the other materials in the secondary battery as the charge and discharge cycle repeats. In the absence of such externally applied pressure, the cycle life of the secondary battery is dramatically reduced.

The systems and methods disclosed herein beneficially improve the energy density and lifetime of a Li-metal anode secondary battery by wrapping the Li-metal anode secondary battery in a thin (e.g., 0.3 mm) metal skin that maintains the Li-metal anode secondary battery under an external pressure (e.g., 0.5 atm) and incorporating the Li-metal anode secondary battery and a rigid, thin, package plate (e.g., 0.1 mm) bonded to the Li-metal anode secondary battery as a structural element in the chassis of a portable electronic device and/or the C-cover or D-cover of a portable processor-based device. Using the systems and methods disclosed herein, the lifetime of a Li-metal anode secondary battery may be increased 30% or more.

An electronic system is provided. The system may include: a structural secondary battery that includes: one or more secondary storage cells; a first compression skin disposed at least partially about a first portion of an external surface of the one or more secondary storage cells; a second compression skin disposed at least partially about a second portion of an external surface of the one or more secondary storage cells; wherein the second compression skin physically couples to the first compression skin to trap at least a portion of the one or more secondary storage cells therebetween; a structural member having a first physical geometry physically coupled to the one or more secondary storage cells; an electronic device chassis that includes an aperture having a second physical geometry, the aperture to accommodate at least a partial insertion of the structural secondary battery; wherein the second physical geometry is similar to the first physical geometry; and one or more attachment fixtures to physically couple the structural secondary battery to the electronic device chassis.

A method of incorporating a structural secondary battery in an electronic device chassis is provided. The method may include: disposing a first compression skin about at least a first portion of an external surface of one or more secondary storage cells; disposing a second compression skin about at least a second portion of an external surface of the one or more secondary storage cells; physically coupling the first compression skin to the second compression skin to trap at least a portion of the one or more secondary storage cells between the first compression skin and the second compression skin; physically coupling a structural member to at least a portion of the first compression skin to provide the structural secondary battery; and physically coupling the structural secondary battery to the electronic device chassis.

A system for incorporating a structural secondary battery in an electronic device chassis is provided. The system may include: means for disposing a first compression skin about at least a first portion of an external surface of one or more secondary storage cells; means for disposing a second compression skin about at least a second portion of an external surface of the one or more secondary storage cells; means for physically coupling the first compression skin to the second compression skin to trap at least a portion of the one or more secondary storage cells between the first compression skin and the second compression skin; means for physically coupling a structural member to at least a portion of the first compression skin to provide the structural secondary battery; and means for physically coupling the structural secondary battery to the electronic device chassis.

As used herein, the term "secondary storage cell" refers to any type of currently available or future developed energy storage device that is capable of a plurality of charge/discharge cycles. Example secondary storage cells may include but are not limited to: Aluminum-ion batteries, carbon batteries, flow batteries, lead/acid batteries, glass batteries, lithium-ion (Li-ion) batteries, magnesium-ion (Mg-ion) batteries, metal/air electrochemical cells, and nickel/cadmium (NiCad) batteries.

Figure 1A:
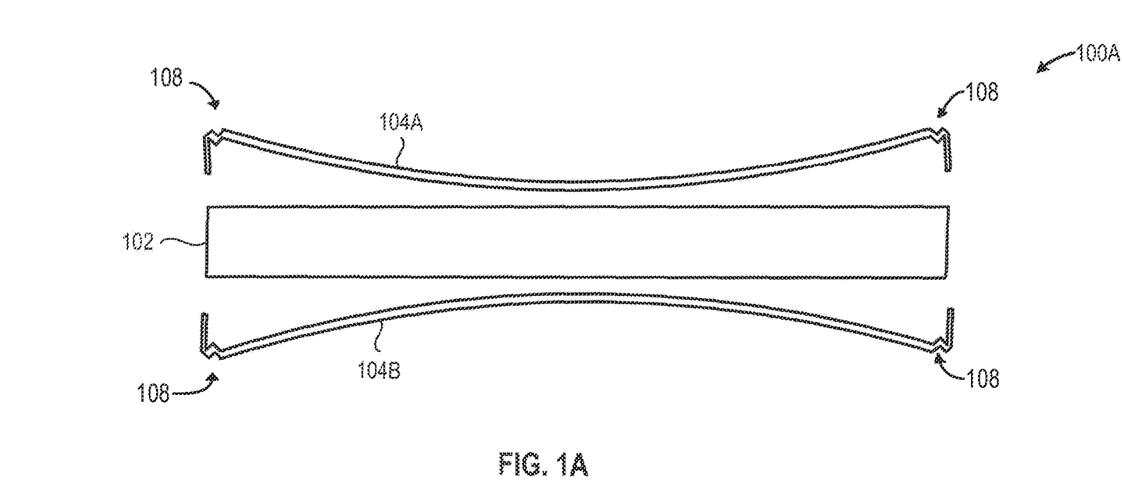
FIG. 1A is a side elevation view of a tensioned first compression skin and a tensioned second compression skin prior to disposing the first compression skin and the second compression skin prior to disposal proximate at least a portion of the surface of one or more secondary storage cells, in accordance with at least one embodiment described herein.
Figure 1B:
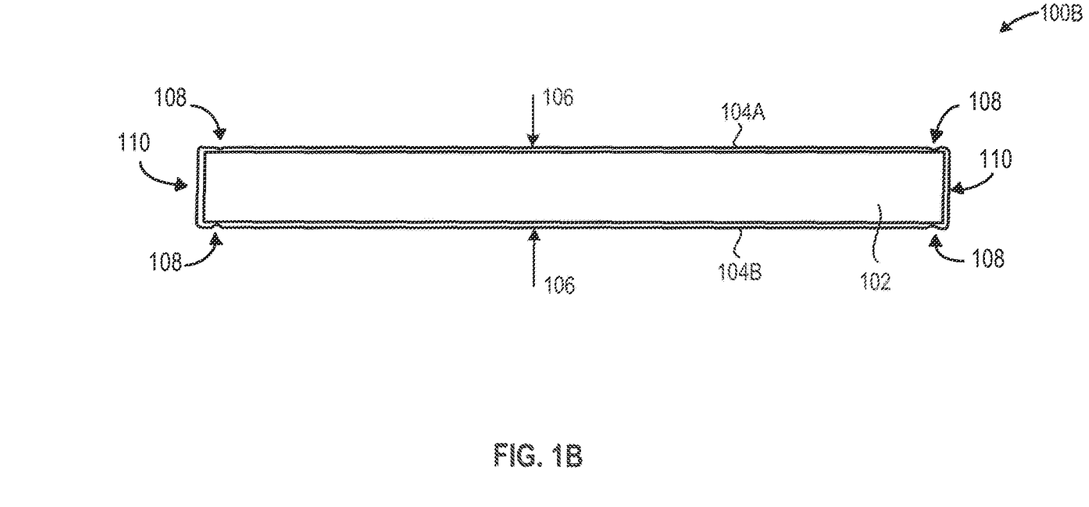
FIG. 1B is a side elevation view of the first compression skin and the second compression skin after being disposed proximate at least a portion of an external surface of the first compression skin and the second compression skin such that a compressive force is applied to the one or more secondary storage cells to provide a pressurized secondary battery, in accordance with at least one embodiment described herein.

FIGS. 1A and 1B illustrate cross-sectional views of a pressurized secondary battery 100 in which one or more secondary storage cells 102 are at least partially surrounded by a first compression skin 104A bonded to a second compression skin 104B such that the first compression skin 104A and the second compression skin 104B exert a compressive force 106 across at least a portion of the surface of the one or more secondary storage cells 102, in accordance with at least one embodiment described herein. FIG. 1A depicts the first compression skin 104A and the second compression skin 104B prior to bonding about the one or more secondary storage cells 102. As depicted in FIG. 1A, either or both the first compression skin 104A and/or the second compression skin 104B may be preformed such that when the first compression skin 104A is physically coupled to the second compression skin 104B, a generally uniform compressive force 106 is applied to at least a portion of the external surface of the one or more secondary storage cells 102. In embodiments, each of the one or more secondary storage cells 102 may include, for example, one or more Li-metal anode type storage cells and/or any other type of secondary storage cell that may specify being maintained under an external pressure 106 and/or may gain increased service or discharge cycle life when maintained under a compressive force 106.

In embodiments, the one or more secondary storage cells 102 may have any physical size, physical geometry, and/or principal dimensions. For example, the one or more secondary storage cells 102 may have a rectangular physical geometry having principal dimensions of length and width. For example, the one or more secondary storage cells 102 may include one or more Li-metal anode secondary storage cells 102 having a length of 80 millimeters by 60 millimeters. In many portable electronic devices the one or more secondary storage cells 102 is surface mounted on a chassis or similar structure and to maintain overall thickness of the portable electronic device at an acceptable value, the thickness of the one or more secondary storage cells 102 is limited to a value of about 2 mm, for example 2.2 mm. Using the systems and methods disclosed herein, by incorporating the one or more secondary storage cells 102 as a structural element into the chassis or housing of a portable electronic device, the capacity of the one or more secondary storage cells 102 is increased. By incorporating a Li-metal anode into the one or more secondary storage cells 102 (i.e., using a Li-metal anode secondary battery), the energy density of the one or more secondary storage cells 102 may be increased—together, the combination of increased capacity and increased energy density may beneficially improve the discharge time of the one or more secondary storage cells 102 by 30% or more.

The first compression skin 104A and/or the second compression skin 104B are disposed about at least a portion of the external surface of the one or more secondary storage cells 102. For example, in some embodiments, the first compression skin 104A and/or the second compression skin 104B may be disposed about the top, bottom, and side surfaces of the one or more secondary storage cells 102. One or more edge spring features 108 may be formed, stamped, embossed, or otherwise disposed along all or a portion of a peripheral edge of each of the first compression spring 104A and/or the second compression spring 104B. In embodiments, the one or more edge spring features 108 beneficially maintains a relatively consistent compressive force 106 across the edges of the one or more secondary storage cells. The first compression skin 104A and/or the second compression skin 104B may be physically coupled 110 using any physical, chemical, and/or thermal bonding technique or combinations thereof. For example, the first compression skin 104A and/or the second compression skin 104B may be thermally bonded 110 via welding. Once physically coupled together, the first compression skin 104A and/or the second compression skin 104B exert a compressive force 106 across at least a portion of the external surface of the one or more secondary storage cells 102, thereby limiting the deflection and/or deformation of the one or more secondary storage cells 102 during usage, such as during charging and/or discharging. In embodiments, the compressive force 106 applied by the first compression skin 104A and/or the second compression skin 104B may be similar across all or a portion of the external surface of the one or more secondary storage cells 102 or may vary by location across all or a portion of the external surface of the one or more secondary storage cells 102. In embodiments, when physically coupled, the first compression skin 104A and/or the second compression skin 104B may exert a compressive force 106 on the one or more secondary storage cells 102 of about: 0.25 atm (~3.7 pounds per square inch/psi) or less; 0.50 atm (~7.3 psi) or less; 0.75 atm (~11.0 psi) or less; 1.00 atm (~14.7 psi) or less; 1.25 atm (~18.4 psi) or less; or 1.50 atm (~22.0 psi) or less.

The first compression skin 104A and/or the second compression skin 104B may be fabricated using one or more metallic or non-metallic materials. Example metallic materials include but are not limited to: stainless steel alloys, titanium/titanium containing alloys, aluminum/aluminum containing alloys, and similar. Example non-metallic materials include but are not limited to: thermoplastic polymer materials, thermosetting polymer materials, carbon fiber/carbon fiber containing materials, fiber reinforced plastic materials, or combinations thereof. The thickness of the first compression skin 104A and/or the second compression skin 104B may be determined based upon the physical properties of the materials used in constructing the first compression skin 104A and/or the second compression skin 104B and the desired compressive force 106 the first compression skin 104A and/or the second compression skin 104B will apply to the one or more secondary storage cells 102. In at least one embodiment, the first compression skin 104A and/or the second compression skin 104B may be fabricated using 0.30 mm thick stainless steel to exert an external force 106 of about 0.5 atm/7.3 psi across at least a portion of the external surface of the one or more secondary storage cells 102.

Figure 2:
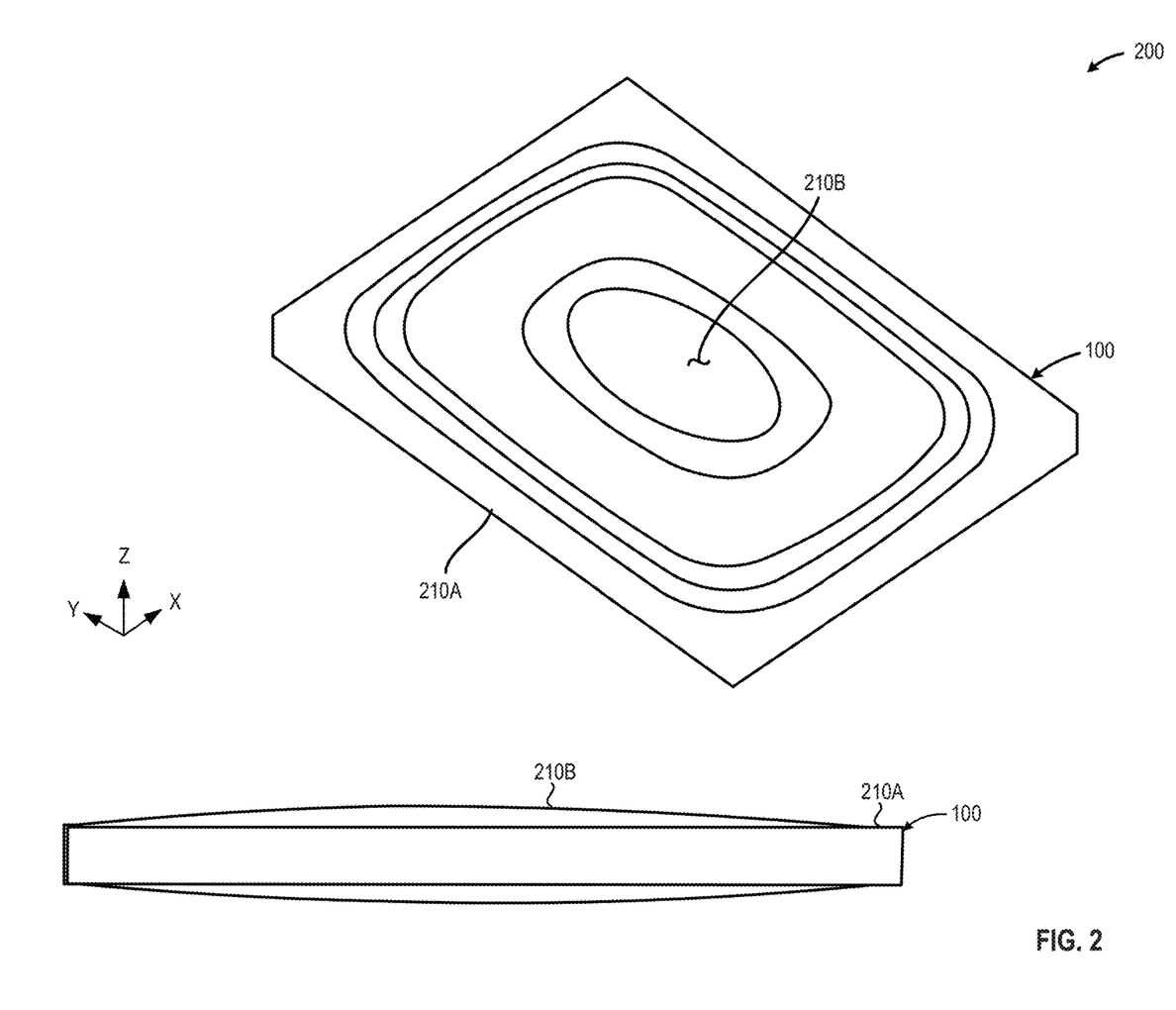
FIG. 2 illustrates a hypothetical deflection profile model for an illustrative Li-metal anode secondary battery in which the first compression skin and/or the second compression skin include 0.30 millimeter thick stainless steel members and the compressive force exerted on the one or more secondary storage cells is maintained at about 0.5 atmospheres (7.3 pounds force per square inch), in accordance with at least one embodiment described herein.

FIG. 2 illustrates a three-dimensional plot 200 providing a hypothetical pre-deformation compensation value to maintain a 0.5 atmosphere (~7.3 pounds force per square inch) compressive force on the one or more secondary storage cells 102, in accordance with at least one embodiment described herein. As illustrated in the embodiment depicted in FIG. 2, the pre-deformation of the first compression skin 104A and/or the second compression skin 104B is approximately 1.3 millimeters using a 0.30 millimeter thick stainless steel compression skin. Displacement 210 along the edges of the compressive skin 104 is negligible and the maximum displacement 220 is approximately 1.3 millimeters.

Figure 3:
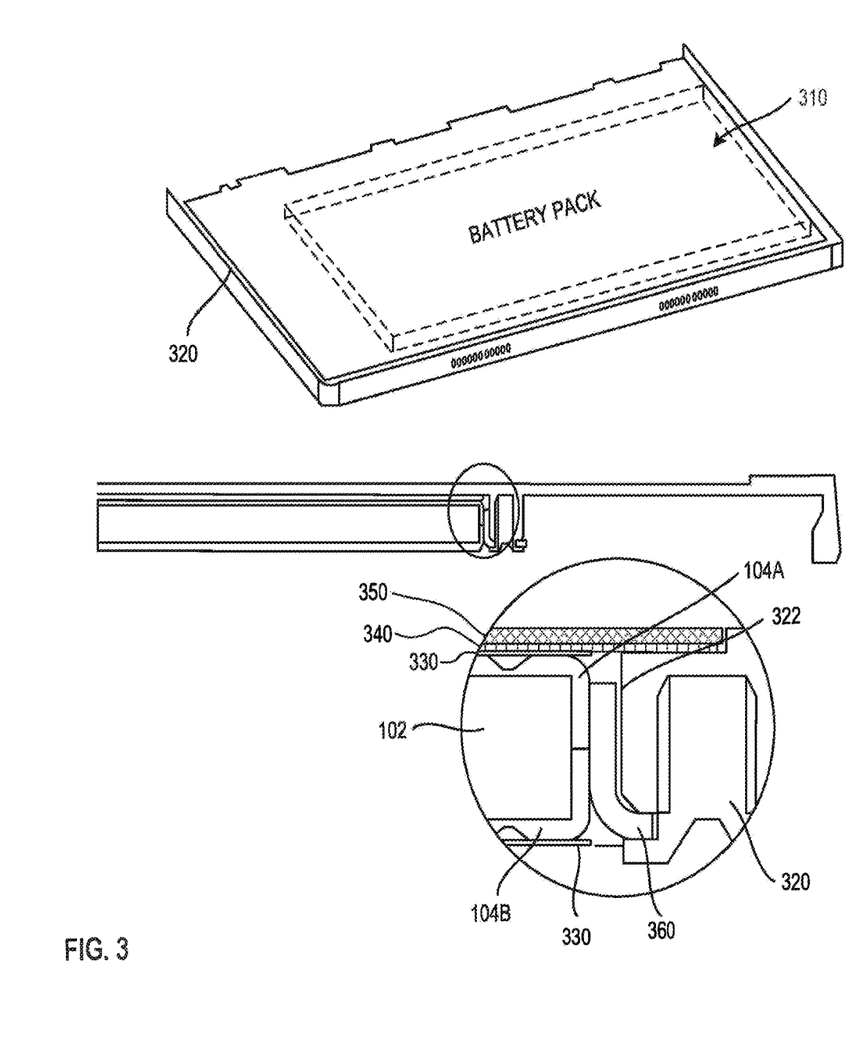
FIG. 3 depicts an illustrative structural secondary battery physically coupled to an electronic device chassis, in accordance with at least one embodiment described herein.

FIG. 3 depicts an illustrative structural secondary battery 310 physically coupled to an electronic device chassis 320, in accordance with at least one embodiment described herein. Although the structural secondary battery 310 in FIG. 3 is depicted as physically coupled to an electronic device housing 320, those of skill in the relevant arts will readily appreciate the applicability of such a structural secondary battery 310 in other embodiments, such as an electronic device housing. For example, the structural secondary battery 310 may form a portion of a portable computing device C-cover or D-cover, or a tablet/smartphone backplate. As depicted in FIG. 3, in embodiments, the secondary battery 100 may have a thickness of about 3.50 millimeters and the structural secondary battery 310 may have an overall thickness of about 3.90 millimeters. In embodiments, the addition of a wrapper 330, a structural member 340, and an adhesive layer 350 to the secondary battery 100 may add between 0.30 millimeters and 0.60 millimeters to the overall thickness of the secondary battery 100. In the embodiment depicted in FIG. 3, the wrapper 330, the structural member 340, and the adhesive layer 350 increases the thickness of the secondary battery 100 by 0.40 millimeters.

The electronic device chassis 320 includes an aperture 322 to accommodate the insertion of the structural secondary battery 310. In embodiments, the aperture 322 may have any physical geometry, having one or more principal dimensions. For example, in embodiments, the aperture 322 may include a rectangular aperture 322 having principal dimensions of length and width. In another example, the aperture 322 may include a square aperture 322 having a principal dimension of side length. In embodiments, the principal dimensions of the aperture 322 maybe slightly larger than the principal dimensions of the one or more secondary storage cells 102 included in the structural battery and/or the structural member 340 coupled to the one or more secondary storage cells 102.

As depicted in FIG. 3, the structural secondary battery 310 includes one or more layers of a packaging material 330 disposed proximate and about all or a portion of the first compression skin 104A and all or a portion of the second compression skin 104B. The one or more layers of packaging material 330 may include one or more layers of protective materials, one or more layers of decorative materials, or any combination thereof. For example, the packaging material 330 may include a 0.1 mm thick mylar material that provides decoration and a degree of protection from environmental contaminants and/or moisture.

The structural secondary battery 310 includes a structural member 340 physically coupled to the secondary battery to provide the structural rigidity to the secondary battery 310. In some embodiments, the structural member 340 may be sized to overlay an aperture 322 formed in the electronic device chassis 320, thereby closing or sealing the aperture 322 upon physically coupling the structural secondary battery 310 to the electronic device chassis 320. The structural member 340 may include one or more rigid metallic members or one or more rigid non-metallic members. Example rigid metallic members may include but are not limited to: aluminum/aluminum containing compounds or alloys (e.g., sapphire glass); stainless steel alloys; titanium/titanium containing compounds or alloys, and similar. Example rigid non-metallic members include but are not limited to: carbon fiber/carbon fiber containing materials and similar. The thickness of the structural member 340 may be selected based, at least in part, on the rigidity of the material selected for the structural member 340 and/or the physical dimensions, size, and/or geometry of the structural member 340. In embodiments, the structural member 340 may have a uniform thickness. For example, the structural member 340 may have a thickness of about: 0.05 millimeters (mm) or less; 0.1 mm or less; 0.15 mm or less; 0.20 mm or less; or 0.25 mm or less. As shown in the embodiment depicted in FIG. 3, the structural member 340 may have a thickness of about 0.1 mm. In other embodiments, the structural member 340 may have a differing thickness across all or a portion of the member. For example, in some embodiments, the structural member 340 may be thicker about the peripheral portion of the structural member 340 that overlays the perimeter of the aperture 322 formed in the electronic device chassis 320. In embodiments, the structural member 340 may have a Young's Modulus (at 20° C.) of about: 300 Giga-Pascals (GPa) or greater; 350 GPa or greater; 400 GPa or greater; 450 GPa or greater; or 500 GPa or greater.

In embodiments, the structural member 340 may be permanently or detachably attached to the physically coupled to the one or more secondary storage cells 102 to form the structural secondary battery 310. In embodiments, the structural member 340 may be permanently or detachably attached to the one or more secondary storage cells 102 using one or more permanent fasteners (e.g., rivets), one or more removable fasteners (e.g., threaded fasteners), or combinations thereof. In embodiments, such as depicted in FIG. 3, a chemical bonding agent or adhesive layer 350 may be used to affix the structural member 340 to the one or more secondary storage cells 102. In some embodiments, the adhesive layer 350 may include one or more thermally conductive adhesive layers. The adhesive layer 350 may have any thickness. For example, the adhesive layer 350 may have a thickness of about 0.05 millimeters (mm) or less; 0.1 mm or less; 0.15 mm or less; 0.20 mm or less; or 0.25 mm or less. As shown in the embodiment depicted in FIG. 3, the adhesive layer 350 may have a thickness of about 0.1 mm. Thus, the assembled structural secondary battery 310 may have an overall thickness of about 3.90 millimeters.

In some embodiments, the structural secondary battery 310 may be retained in the electronic device chassis 320 using one or more fasteners 360, for example one or more clips as depicted in FIG. 3. In embodiments, the one or more fasteners 360 may be fabricated using a flexible material biased toward the aperture 322 in the electronic device chassis 320 or to the aperture 322 in an electronic device housing. As the structural secondary battery 310 inserted into the aperture 322, the one or more fasteners 360 are forced back towards the electronic device chassis 320. In embodiments, the structural secondary battery 310 is maintained via a friction fit between all or a portion of the first compression skin 104A and the second compression skin 104B and the one or more fasteners 360. In embodiments, the structural member 340 may overlay at least a portion of the perimeter of the aperture 322 formed in the electronic device chassis 370.

Figure 4A:
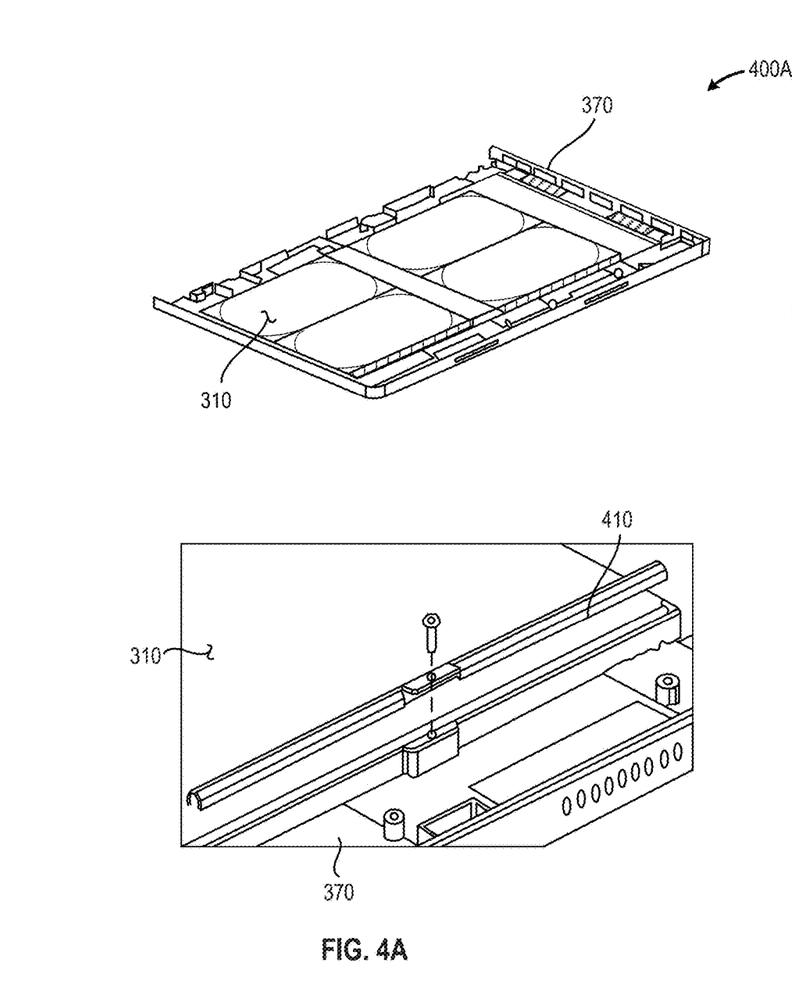
FIG. 4A depicts a perspective view of a system that includes an illustrative structural secondary battery in which a at least a portion of the periphery of the structural member at least partially overlays or overlaps the perimeter of the aperture in an electronic device chassis, in accordance with at least one embodiment described herein.

FIG. 4A depicts a perspective view of a system 400A that includes an illustrative structural secondary battery 310 in which the structural member 340 at least partially overlays the perimeter of the aperture 322 in an electronic device chassis 320, in accordance with at least one embodiment described herein. As depicted in FIG. 4A, in some embodiments, the structural secondary battery 310 may be physically coupled to the electronic device chassis 320 using an adhesive or similar chemical bonding agent between a peripheral portion of the structural member 340 and the perimeter of the aperture 322 in the electronic device chassis 320. In embodiments, a retaining bracket 410 may be affixed to the electronic device chassis 320 to physically couple the structural secondary battery 310 to the electronic device chassis 320.

Figure 4B:
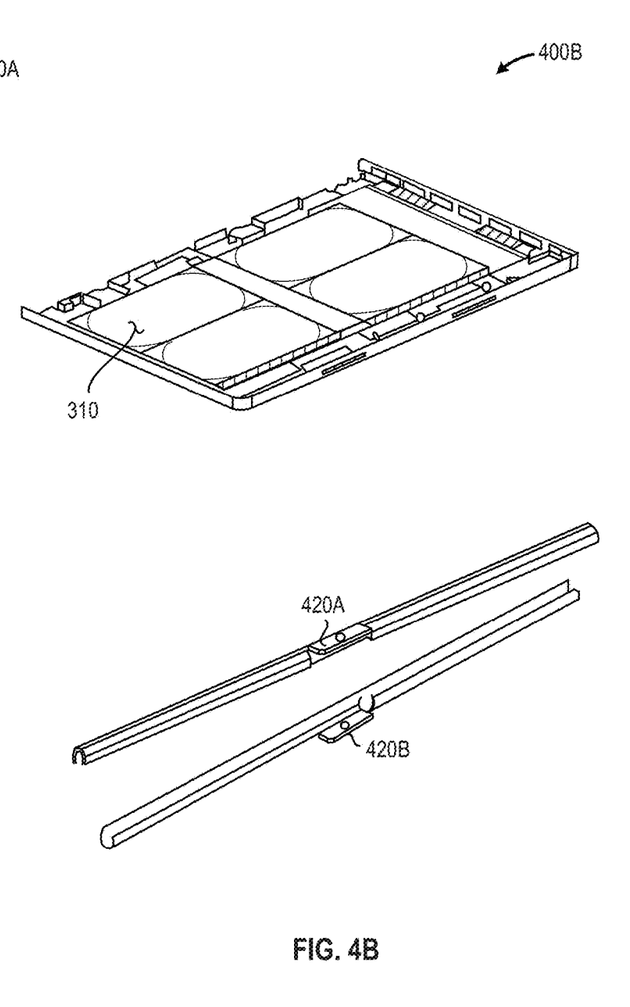
FIG. 4B is a perspective view of a system that includes an illustrative structural secondary battery in which an upper retaining bracket and a lower retaining bracket retain the structural secondary battery in an aperture formed in the electronic device chassis, in accordance with at least one embodiment described herein.

FIG. 4B is a perspective view of a system 400B that includes an illustrative structural secondary battery 310 in which an upper retaining bracket 420A and a lower retaining bracket 420B retain the structural secondary battery 310 in an aperture 322 formed in the electronic device chassis 320, in accordance with at least one embodiment described herein. As depicted in FIG. 4B, in some embodiments, the upper retaining bracket 420A and the lower retaining bracket 420B may be affixed to the electronic device chassis 320 to physically couple the structural secondary battery 310 to the electronic device chassis 320.

Figure 5A:
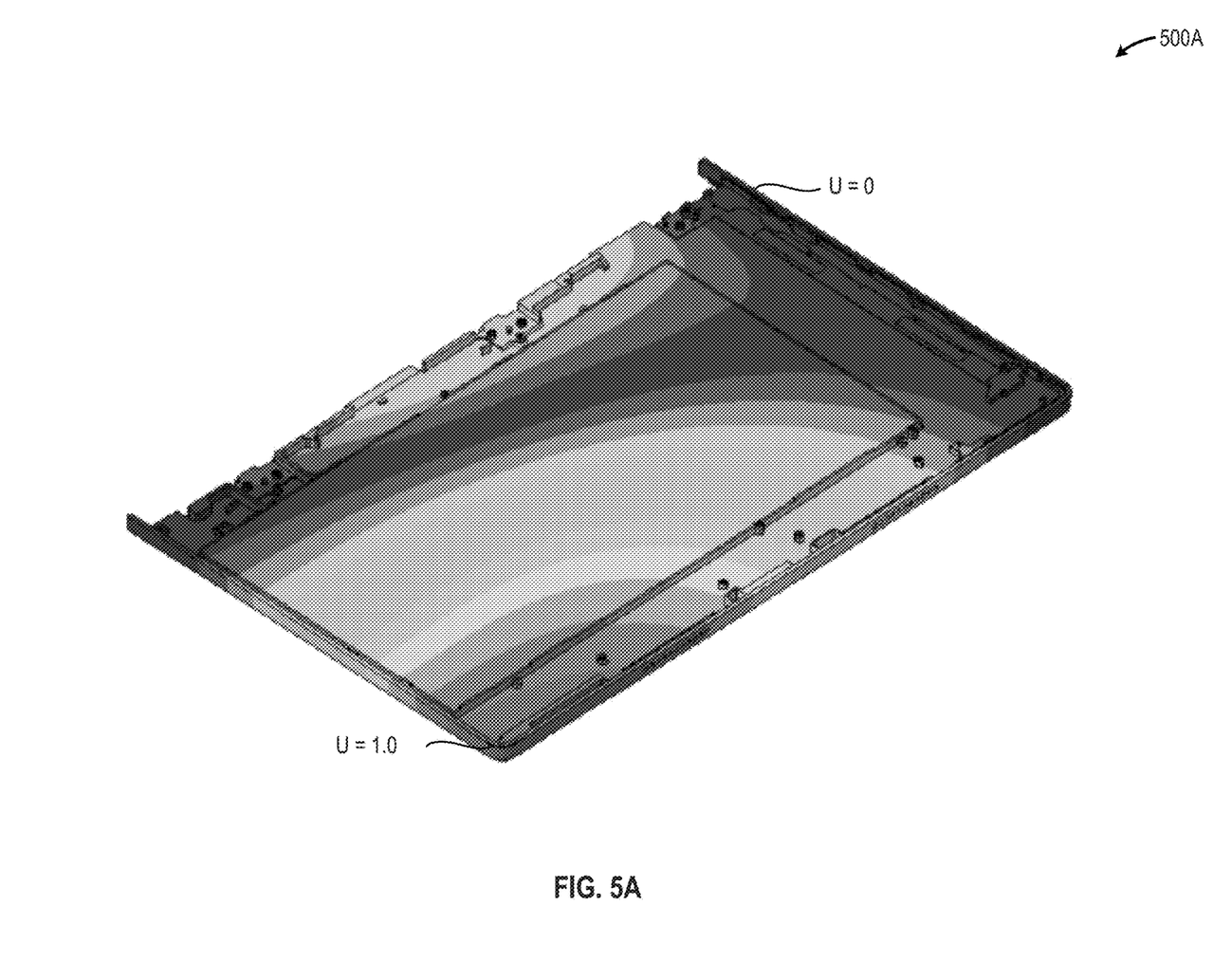
FIG. 5A is a three-dimensional distortion plot of an electronic device chassis that includes a conventional secondary storage device when a five newton force applied to the corner of the electronic device chassis, in accordance with at least one embodiment described herein.
Figure 5B:
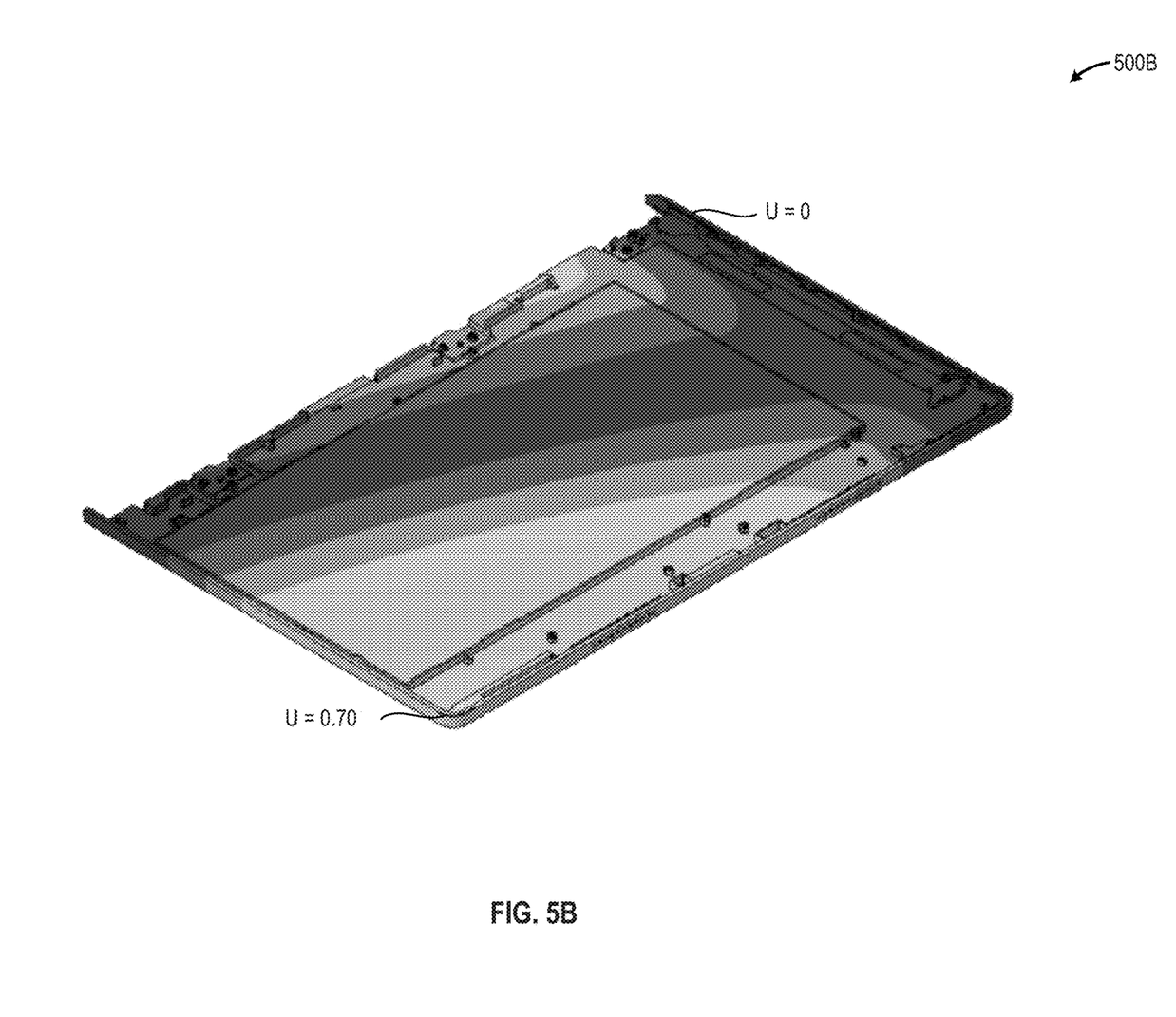
FIG. 5B is a three-dimensional distortion plot of an electronic device chassis that includes a structural secondary battery as described herein when a five newton force applied to the corner of the electronic device chassis, in accordance with at least one embodiment described herein.

FIG. 5A is a three-dimensional distortion plot 500A of an electronic device chassis 510 that includes a conventional secondary storage device when a five newton force applied to the corner of the electronic device chassis 510, in accordance with at least one embodiment described herein. FIG. 5B is a three-dimensional distortion plot 500B of an electronic device chassis 510 that includes a structural secondary battery 320 as described herein when a five newton force applied to the corner of the electronic device chassis 510, in accordance with at least one embodiment described herein. By comparing FIG. 5A and FIG. 5B, in embodiments, the structural secondary battery 320 beneficially improves the stiffness of the electronic device chassis 320 by approximately 30%.

Figure 6:
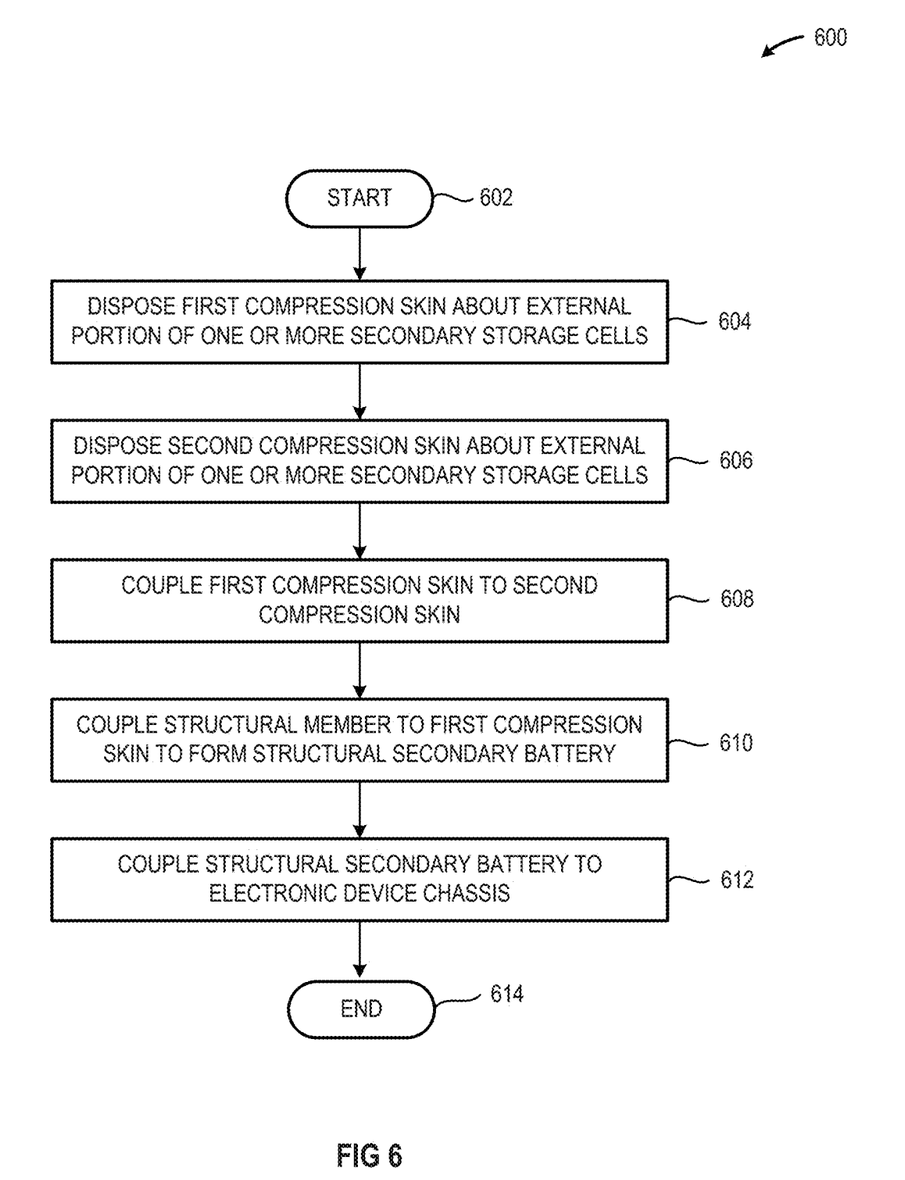
FIG. 6 is a high level flow diagram of an illustrative method of improving the structural rigidity of an electronic device chassis using structural secondary battery, in accordance with at least one embodiment described herein.

FIG. 6 is a high level flow diagram of an illustrative method 600 of improving the structural rigidity of an electronic device chassis using structural secondary battery, in accordance with at least one embodiment described herein. In embodiments, the structural secondary battery 310 may include one or more secondary storage cells 102, such as one or more lithium ion batteries. In embodiments, the one or more secondary storage cells 102 may include a lithium-metal (Li-metal) anode. In embodiments using a Li-metal anode, the first compression skin 104A and the second compression skin 104B may be pre-tensioned such that when the first compression skin 104A couples to the second compression skin 104B a compressive force of at least 0.5 atmospheres (~7.3 pounds force per square inch) is maintained across all or a portion of the external surface of the one or more secondary storage cells 102. The method 600 commences at 602.

At 604, a first compression skin 104A may be disposed proximate at least a portion of the external surface of one or more secondary storage cells 102, such as one or more Li-metal anode Li-ion storage cells 102. In embodiments, the first compression skin 104A may include a 0.30 millimeter thick stainless steel compression skin 104A.

At 606, a second compression skin 104B may be disposed proximate at least a portion of the external surface of the one or more secondary storage cells 102, such as the one or more Li-metal anode Li-ion storage cells 102. In embodiments, the second compression skin 104B may include a 0.30 millimeter thick stainless steel compression skin 104B.

At 608, the first compression skin 104A is physically coupled to the second compression skin 104B. In embodiments, at least a portion of the edge of the first compression skin 104A may be permanently or detachably attached to at least a portion of the edge of the second compression skin 104B. In at least some embodiments, at least a portion of the edge of the first compression skin 104A may be thermally bonded to at least a portion of the edge of the second compression skin 104B. In at least some embodiments, at least a portion of the edge of the first compression skin 104A may be welded to at least a portion of the edge of the second compression skin 104B. In embodiments, when coupled, the first compression skin 104A and the second compression skin 104B exert a compressive force 106 on the one or more secondary storage cells 102. For example, the first compression skin 104A and the second compression skin 104B may exert a compressive force 106 of at least 0.5 atmospheres (~7.3 pounds force per square inch) on the one or more secondary storage cells 102.

At 610, a structural member 340 is physically coupled to the first compression skin 104A. The structural member 340 may include one or more rigid members, such as one or more sapphire crystal members. In embodiments, the structural member 340 may be permanently or detachably attached to the first compression skin 104A. In embodiments, the structural member 340 may be affixed to the first compression skin 104A using a chemical bonding agent or adhesive layer 350 to form the structural secondary battery 310.

At 612, the structural secondary battery 310 may be physically coupled to an aperture 322 formed in an electronic device chassis 320 and/or an aperture 322 formed in an electronic device housing. In embodiments, one or more fasteners 360 may be disposed proximate the aperture 322 in the electronic device chassis 320 and the structural secondary battery 310 may be retained in the aperture 322 via friction fit between the one or more fasteners 360 and the structural secondary battery 310. In embodiments, at least a portion of the peripheral region of the structural member 360 may be affixed to the perimeter of the aperture 322 using one or more chemical bonding materials, one or more fasteners (threaded fasteners, rivets, etc.), or combinations thereof. Affixing the structural secondary battery 310 to the electronic device chassis 320 beneficially increases the stiffness of the electronic device chassis 320. The method 612 concludes at 614.

While FIG. 6 illustrates various operations according to one or more embodiments, it is to be understood that not all of the operations depicted in FIG. 6 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for improving the rigidity or stiffness of an electronic device chassis and/or an electronic device housing such as a laptop C-cover or D-cover, using a structural secondary battery. The structural secondary battery includes a compression skin disposed about one or more secondary storage cells. The compression skin exerts a compressive force of at least 0.5 atmospheres on the one or more secondary storage cells. The one or more secondary storage cells may include one or more Li-metal anode Li-ion storage cells. A structural member is bonded to the compression skin. The structural member includes a relatively thin, 0.1 mm or less, rigid, having a Young's Modulus of at least 300 GPa, member, such as a sapphire crystal. The structural member may then be bonded or otherwise detachably or non-detachably affixed to an aperture formed in the electronic device chassis or housing. The bonding of the structural member to the electronic device chassis or housing beneficially improves the stiffness of the chassis or housing.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for increasing the stiffness or rigidity of an electronic device chassis or housing through the use of a structural secondary battery affixed to an aperture formed in the electronic device chassis or housing.

According to example 1, there is provided an electronic system. The system may include: a structural secondary battery that includes: one or more secondary storage cells; a first compression skin disposed at least partially about a first portion of an external surface of the one or more secondary storage cells; a second compression skin disposed at least partially about a second portion of an external surface of the one or more secondary storage cells; wherein the second compression skin physically couples to the first compression skin to trap at least a portion of the one or more secondary storage cells therebetween; a structural member having a first physical geometry physically coupled to the one or more secondary storage cells; an electronic device chassis that includes an aperture having a second physical geometry, the aperture to accommodate at least a partial insertion of the structural secondary battery; wherein the second physical geometry is similar to the first physical geometry; and one or more attachment fixtures to physically couple the structural secondary battery to the electronic device chassis.

Example 2 may include elements of example 1 where the one or more secondary storage cells comprises one or more Li-ion secondary batteries.

Example 3 may include elements of examples 1 or 2 where the one or more Li-ion secondary batteries comprise one or more Li-metal anode secondary batteries.

Example 4 may include elements of any of examples 1 through 3 where the first compression skin and the second compression skin each include a stainless steel member.

Example 5 may include elements of any of examples 1 through 4 where the second compression skin physically couples to the first compression skin via thermal bonding.

Example 6 may include elements of any of examples 1 through 5 where the second compression skin physically couples to the first compression skin via welding.

Example 7 may include elements of any of examples 1 through 6 where an adhesive layer physically couples the structural member to at least a portion of the first compression skin disposed at least partially about the one or more secondary storage cells.

Example 8 may include elements of any of examples 1 through 7 where the electronic device chassis comprises a printed circuit board disposed at least partially within an electronic device housing.

Example 9 may include elements of any of examples 1 through 8 where the electronic device chassis comprises at least a portion of an electronic device housing.

Example 10 may include elements of any of examples 1 through 9 where the second physical geometry comprises an aperture physical geometry having a perimeter with one or more principal dimensions less than a one or more corresponding principal dimensions of the first physical geometry of a periphery of the structural member such that at least a portion of the structural member overlays at least a portion of the perimeter of the aperture.

Example 11 may include elements of any of examples 1 through 10 where the one or more attachment fixtures include one or more adhesive materials disposed between the periphery of the structural member and the perimeter of the aperture.

Example 12 may include elements of any of examples 1 through 11 where the one or more attachment fixtures further comprise one or more mounting brackets in contact with the structural secondary battery and physically coupled to the electronic device chassis.

Example 13 may include elements of any of examples 1 through 12 where the second physical geometry comprises an aperture physical geometry having a perimeter with one or more principal dimensions similar to one or more corresponding principal dimensions of the first physical geometry of a periphery of the structural member such that at least a portion of the structural member fits inside at least a portion of the perimeter of the aperture.

Example 14 may include elements of any of examples 1 through 13 where the one or more attachment fixtures further comprise: a first mounting bracket in contact with a first surface of the structural secondary battery and physically coupled to an upper surface of the electronic device chassis; a second mounting bracket in contact with a second surface of the structural secondary battery and physically coupled to an lower surface of the electronic device chassis; wherein the first surface of the structural secondary battery is transversely opposed across a thickness of the structural secondary battery to the second surface of the structural secondary battery; and wherein the upper surface of the electronic device chassis is transversely opposed across a thickness of the electronic device chassis to the lower surface of the electronic device chassis.

Example 15 may include elements of any of examples 1 through 14 where the structural member comprises a structural member having a Young's Modulus of at least 400 Gigapascals (GPa).

Example 16 may include elements of any of examples 1 through 15 where the structural member comprises a sapphire crystal structural member having a thickness 0.1 mm or less.

According to example 17, there is provided a method of incorporating a structural secondary battery in an electronic device chassis. The method may include: disposing a first compression skin about at least a first portion of an external surface of one or more secondary storage cells; disposing a second compression skin about at least a second portion of an external surface of the one or more secondary storage cells; physically coupling the first compression skin to the second compression skin to trap at least a portion of the one or more secondary storage cells between the first compression skin and the second compression skin; physically coupling a structural member to at least a portion of the first compression skin to provide the structural secondary battery; and physically coupling the structural secondary battery to the electronic device chassis.

Example 18 may include elements of example 17 where physically coupling the first compression skin to the second compression skin comprises: thermally bonding at least a portion of an edge of the first compression skin to at least a portion of an edge of the second compression skin.

Example 19 may include elements of any of examples 17 or 18 where physically coupling the structural member to at least a portion of the first compression skin to provide the structural secondary battery further comprises: physically coupling a sapphire crystal structural member to at least a portion of the first compression skin to provide the structural secondary battery.

Example 20 may include elements of any of examples 17 through 19 where physically coupling the 0.1 mm thick sapphire crystal to at least a portion of the first compression skin to provide the structural secondary battery further comprises: physically coupling, via an adhesive layer disposed across at least a portion of the first compression skin, the sapphire crystal structural member to at least a portion of the first compression skin to provide the structural secondary battery.

Example 21 may include elements of any of examples 17 through 20 where disposing the first compression skin about at least the first portion of the external surface of the one or more secondary storage cells further comprises: disposing the first compression skin about at least the first portion of the external surface of one or more Li-metal anode Li-ion secondary batteries; and where disposing the second compression skin about at least the second portion of the external surface of the one or more secondary storage cells further comprises: disposing the second compression skin about at least the second portion of the external surface of the one or more Li-metal anode Li-ion secondary batteries.

Example 22 may include elements of any of examples 17 through 21 where physically coupling the first compression skin to the second compression skin to trap at least a portion of the one or more secondary storage cells between the first compression skin and the second compression skin further comprises: physically coupling the first compression skin to the second compression skin to trap at least a portion of the one or more secondary storage cells between the first compression skin and the second compression skin such that the first compressive skin and the second compressive skim apply a compressive force of at least 0.5 atm (7.3 pounds force per square inch) to the one or more Li-metal anode Li-ion secondary batteries.

According to example 23, there is provided a system for incorporating a structural secondary battery in an electronic device chassis. The system may include: means for disposing a first compression skin about at least a first portion of an external surface of one or more secondary storage cells; means for disposing a second compression skin about at least a second portion of an external surface of the one or more secondary storage cells; means for physically coupling the first compression skin to the second compression skin to trap at least a portion of the one or more secondary storage cells between the first compression skin and the second compression skin; means for physically coupling a structural member to at least a portion of the first compression skin to provide the structural secondary battery; and means for physically coupling the structural secondary battery to the electronic device chassis.

Example 24 may include elements of example 23 where the means for physically coupling the first compression skin to the second compression skin comprises: means for thermally bonding at least a portion of an edge of the first compression skin to at least a portion of an edge of the second compression skin.

Example 25 may include elements of any of examples 23 or 24 where the means for physically coupling the structural member to at least a portion of the first compression skin to provide the structural secondary battery further comprises: means for physically coupling a sapphire crystal structural member to at least a portion of the first compression skin to provide the structural secondary battery.

Example 26 may include elements of any of examples 23 through 25 where the means for physically coupling the 0.1 mm thick sapphire crystal to at least a portion of the first compression skin to provide the structural secondary battery further comprises: means for physically coupling, via an adhesive layer disposed across at least a portion of the first compression skin, the sapphire crystal structural member to at least a portion of the first compression skin to provide the structural secondary battery.

Example 27 may include elements of any of examples 23 through 26 where the means for disposing the first compression skin about at least the first portion of the external surface of the one or more secondary storage cells further comprises: means for disposing the first compression skin about at least the first portion of the external surface of one or more Li-metal anode Li-ion secondary batteries; and where the means for disposing the second compression skin about at least the second portion of the external surface of the one or more secondary storage cells further comprises: means for disposing the second compression skin about at least the second portion of the external surface of the one or more Li-metal anode Li-ion secondary batteries.

Example 28 may include elements of any of examples 23 through 27 where the means for physically coupling the first compression skin to the second compression skin to trap at least a portion of the one or more secondary storage cells between the first compression skin and the second compression skin further comprises: means for physically coupling the first compression skin to the second compression skin to trap at least a portion of the one or more secondary storage cells between the first compression skin and the second compression skin such that the first compressive skin and the second compressive skim apply a compressive force of at least 0.5 atm (7.3 pounds force per square inch) to the one or more Li-metal anode Li-ion secondary batteries.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. An electronic device comprising:
    a structural secondary battery including:
        one or more secondary storage cells;
        a first compression skin at least partially about a first portion of an external surface of the one or more secondary storage cells, the first compression skin providing a first spring characteristic;
        a second compression skin at least partially about a second portion of an external surface of the one or more secondary storage cells, the second compression skin providing a second spring characteristic, the second compression skin physically couples to the first compression skin to trap at least a portion of the one or more secondary storage cells therebetween, the first spring characteristic of the first compression skin and the second spring characteristic of the second compression skin are to apply pressure to the one or more secondary storage cells when the first compression skin is coupled to the second compression skin; and
        a plate coupled to the one or more secondary storage cells;
    a chassis having an aperture to at least partially receive the structural secondary battery; and
    one or more attachment fixtures to couple the structural secondary battery and the chassis.

2. The electronic device of claim 1, wherein the one or more secondary storage cells includes one or more Lithium-ion (Li-ion) secondary batteries.

3. The electronic device of claim 2, wherein the one or more Li-ion secondary batteries comprise one or more Li-metal anode secondary batteries.

4. The electronic device of claim 1, wherein the first compression skin and the second compression skin are stainless steel.

5. The electronic device of claim 1, wherein the second compression skin is coupled to the first compression skin via thermal bonding.

6. The electronic device of claim 1, wherein the second compression skin is coupled to the first compression skin via welding.

7. The electronic device of claim 1, further including an adhesive layer to couple the plate to at least a portion of the first compression skin.

8. The electronic device of claim 1, wherein at least a portion of the plate fits inside at least a portion of the perimeter of the aperture.

9. The electronic device of claim 8, wherein the one or more attachment fixtures include:
    a first mounting bracket in contact with a first surface of the structural secondary battery and coupled to an upper surface of the chassis; and
    a second mounting bracket in contact with a second surface of the structural secondary battery and coupled to a lower surface of the chassis;
    wherein the first surface of the structural secondary battery is transversely opposed across a thickness of the structural secondary battery to the second surface of the structural secondary battery; and
    wherein the upper surface of the chassis is transversely opposed across a thickness of the chassis to the lower surface of the chassis.

10. The electronic device of claim 1, wherein the plate has a Young's Modulus of at least 400 Giga-Pascals (GPa).

11. The electronic device of claim 1, wherein the plate is a sapphire crystal having a thickness 0.1 mm or less.

12. The electronic device of claim 1, further including at least four secondary storage cells, wherein the at least four secondary storage cells are adjacent and in a first plane, wherein the first plane is parallel to the first compression skin and the second compression skin.

13. The electronic device of claim 1, further including at least four secondary storage cells, wherein the at least four secondary storage cells are in a non-stacked orientation.

14. The electronic device of claim 1, wherein the first spring characteristic is provided by a first indentation to the first compression skin at a first respective corner of the secondary storage cell and the second spring characteristic is a second indentation at a second respective corner of the secondary storage cell.

15. The electronic device of claim 14, wherein the pressure applied by the first spring characteristic of the first compression skin and the second spring characteristic of the second compression skin is 0.5 atm or greater.

16. An electronic device housing comprising:
a secondary battery including:
a first pre-deformed compression skin;
a second pre-deformed compression skin; and
a secondary storage cell positioned between the first pre-deformed compression skin and the second pre-deformed compression skin, the first pre-deformed compression skin coupled to the second pre-deformed compression skin such that the first pre-deformed compression skin and the second pre-deformed compression skin exert a compressive force across at least a portion of a surface of the secondary storage cell to limit at least one of deflection or deformation of the secondary storage cell during at least one of a charging event or a discharging event of the secondary storage cell;
a plate to provide structural rigidity to the secondary battery;
a chassis having an aperture to receive the secondary battery, the plate to engage a first side of the chassis to cover the aperture; and
a fastener to couple the secondary battery and the chassis when the secondary battery is positioned in the aperture.

17. The electronic device of claim 16, wherein the first pre-deformed compression skin and the second pre-deformed compression skin include notches adjacent corner edges.

18. The electronic device of claim 16, wherein the fastener includes a flexible clip biased toward a central portion of the aperture of the chassis, the flexible clip to deflect toward the chassis when the secondary battery is positioned in the aperture to couple the secondary battery and the chassis via a friction fit connection.

19. The electronic device of claim 16, further including a first package wrapper positioned on the first pre-deformed compression skin and a second package wrapper positioned on the second pre-deformed compression skin, wherein the first package wrapper is positioned between the first pre-deformed compression skin and the plate.

20. The electronic device of claim 16, wherein an upper surface of the plate is flush relative to an upper surface of the chassis.

* * * * *